United States Patent
Satak et al.

(10) Patent No.: US 12,489,520 B2
(45) Date of Patent: Dec. 2, 2025

(54) SYSTEM AND METHOD FOR INTEGRATED OPTIMIZATION OF DESIGN AND PERFORMANCE OF SATELLITE CONSTELLATIONS

(71) Applicant: ASTROME TECHNOLOGIES PRIVATE LIMITED, Bangalore (IN)

(72) Inventors: Neha Satak, Bangalore (IN); Prasad Horabailu Laxminarayana, Bangalore (IN)

(73) Assignee: ASTROME TECHNOLOGIES PRIVATE LIMITED (IN)

( * ) Notice: Subject to any disclaimer, the term of this patent is extended or adjusted under 35 U.S.C. 154(b) by 376 days.

(21) Appl. No.: 18/331,621

(22) Filed: Jun. 8, 2023

(65) Prior Publication Data

US 2023/0318699 A1  Oct. 5, 2023

Related U.S. Application Data

(63) Continuation-in-part of application No. 16/326,916, filed as application No. PCT/IN2017/050353 on Aug. 19, 2017, now Pat. No. 11,708,180.

(30) Foreign Application Priority Data

Aug. 20, 2016 (IN) .............................. 201641021027

(51) Int. Cl.
  *H04B 7/185* (2006.01)
  *B64G 1/10* (2006.01)
  *B64G 1/24* (2006.01)

(52) U.S. Cl.
  CPC ....... *H04B 7/18519* (2013.01); *B64G 1/1085* (2013.01); *B64G 1/242* (2013.01);
  (Continued)

(58) Field of Classification Search
  CPC ............ H04B 7/18513; H04B 7/18517; H04B 7/18519; H04B 7/18521; B64G 1/1085; B64G 1/242; Y02D 30/70
  See application file for complete search history.

(56) References Cited

U.S. PATENT DOCUMENTS

| | | | |
|---|---|---|---|
| 5,424,862 A | * | 6/1995 | Glynn .................. H04B 10/118 455/12.1 |
| 5,787,336 A | * | 7/1998 | Hirschfield ........... H04W 52/52 455/103 |

(Continued)

*Primary Examiner* — Raymond S Dean
(74) *Attorney, Agent, or Firm* — GOUDIE, PLLC (57) ABSTRACT

The embodiments herein provide a system and method for integrated optimization of design and performance of satellite constellations. The present disclosure provides a method for optimization of design and performance of satellite constellation to provide internet connectivity at preset geographic regions. In current methods, the optimizations of subsystems are performed independently and the results are combined, resulting in a loss of overall optimality. The present disclosure defines the relationships between subsystems such that integrity of complete design is tested with fewer complexities and provides an integrated optimization framework, in which every subsystem is optimized individually and collectively. The present disclosure provides a method for optimization of power subsystem of satellites by determining the pattern of payload operation and need for peak power. The present disclosure also provides a method to minimize the number of satellites required in constellations by carefully regulating spot beams formed by individual satellites in constellations.

13 Claims, 4 Drawing Sheets

(52) U.S. Cl.
CPC ..... *H04B 7/18513* (2013.01); *H04B 7/18517* (2013.01); *H04B 7/18521* (2013.01)

(56) References Cited

U.S. PATENT DOCUMENTS

| | | | | |
|---|---|---|---|---|
| 5,862,462 | A * | 1/1999 | Tyner | H04B 7/18515 |
| | | | | 313/45 |
| 5,931,419 | A * | 8/1999 | Collyer | B64G 1/002 |
| | | | | 244/164 |
| 6,184,838 | B1 * | 2/2001 | Rao | H01Q 3/2605 |
| | | | | 343/753 |
| 6,272,345 | B1 * | 8/2001 | Worger | H04B 7/18541 |
| | | | | 455/430 |
| 2007/0167132 | A1 * | 7/2007 | Wahlberg | H04B 7/18573 |
| | | | | 455/3.06 |
| 2015/0266595 | A1 * | 9/2015 | Ghofranian | B64G 1/6462 |
| | | | | 244/172.4 |
| 2018/0013486 | A1 * | 1/2018 | Irani | H04B 7/195 |

* cited by examiner

SYSTEM AND METHOD FOR INTEGRATED OPTIMIZATION OF DESIGN AND PERFORMANCE OF SATELLITE CONSTELLATIONS

CROSS REFERENCE TO RELATED APPLICATIONS

This is a CIP Application of the U.S. patent application Ser. No. 16/326,916 which was filed as a National Phase Application on Feb. 20, 2019, with the title SYSTEM AND METHOD FOR INTEGRATED OPTIMIZATION OF DESIGN AND PERFORMANCE OF SATELLITE CONSTELLATIONS which is corresponding to the PCT Application No. PCT/IN2017/050353 filed on Aug. 19, 2017, with the title "SYSTEM AND METHOD FOR INTEGRATED OPTIMIZATION OF DESIGN AND PERFORMANCE OF SATELLITE CONSTELLATIONS". The PCT Application which in turn claims priority from the Indian Provisional Patent Application No. 201641021027 filed on Jun. 20, 2016, and subsequently Post-dated by 2 months to Aug. 20, 2016, with the title "SYSTEM AND METHOD FOR INTEGRATED OPTIMIZATION OF DESIGN AND PERFORMANCE OF SATELLITE CONSTELLATIONS", the contents of which is included herein by the way of reference.

BACKGROUND

Technical Field

The embodiments herein are generally related to satellite constellations. The embodiments herein are particularly related to a system and method for integrated optimization of design and performance of satellite constellations. The embodiments herein are more particularly related to a system and method for designing a space internet network comprising a constellation of satellites in space and internet gateways on ground, to provide connectivity services to users.

Description of the Related Art

Optimization of design and processes of a satellite or a constellation of satellites, their launch and maintenance is a very important function of space businesses and space organizations engaged in exploratory or commercial activities. The vast range of components and technologies involved in a satellite mission and the number of interdependent factors involved in the design are a major challenge faced in optimization of the satellite systems. Further, in case of the design of constellations comprising a plurality of satellites, the complexity increases manifold.

Currently available optimization tools enable the users to study the effects of changing a parameter of a subsystem, within a range on certain limited performance metrics. However, a plurality of subsystems comprises a satellite mission and interdependencies in design and performance exist across multiple subsystems of a mission.

In the currently available methods, the optimizations of subsystems are performed independently and the independent results are extrapolated and combined. This causes a loss in the overall optimality of the system and results in an increase in manufacturing and launch costs and/or loss in performance of the satellite and satellite constellations. The currently available methods mostly limit their focus to subsystem level optimization because handling interdependencies generally means higher complexity, which translates to higher design costs.

Hence, there is a need for a system that defines the relationships between all subsystems such that the integrity of complete design is tested with very less complexities. There is also a need for an integrated optimization framework in which every subsystem is optimized individually and collectively within the system.

The above mentioned shortcomings, disadvantages and problems are addressed herein and which will be understood by reading and studying the following specification.

OBJECT OF THE EMBODIMENTS HEREIN

The primary object of the embodiments herein is to provide a system and method for integrated optimization of design and performance of satellite constellations.

Another object of the embodiments herein is to provide a system that defines the relationships between all subsystems in a satellite constellation mission, such that the integrity of complete design is tested with very less complexities.

Yet another object of the embodiments herein is to provide an integrated optimization framework in which every subsystem is optimized individually and collectively within the system, and the business aspects are also captured as a subsystem.

Yet another object of the embodiments herein is to provide an integrated optimization framework in which system-level and subsystem-level optimization is provided necessary priorities.

Yet another object of the embodiments herein is to provide a simplified representation of all subsystems used to evaluate if a subsystem level re-design is required upon a change in design of another subsystem.

Yet another object of the embodiments herein is to provide decision logic to check the coherence of design across multiple subsystems and determine which subsystems need a re-design.

Yet another object of the embodiments herein is to provide a satellite-constellation optimization method that is applicable to a plurality of constellation types and optimizes multiple objectives.

Yet another object of the embodiments herein is to provide an image-based coverage calculation approach that increases the speed of calculating coverage over a region by a constellation of satellites as a function of time.

Yet another object of the embodiments herein is to provide a method to translate industry requirements into Flower constellation design constraints and create an optimization procedure to get the best constellation for a particular mission.

Yet another object of the embodiments herein is to provide a launch sequence to enable early utilization of satellites before completion of constellation and provide feasible launch sequences based on the availability of launch vehicles from one or more service providers.

Yet another object of the embodiments herein is to provide a method for optimization of power consumption in satellites in a constellation by determining the pattern of operation of payloads and the need of peak power.

Yet another object of the embodiments herein is to provide a constellation of about 200 satellites to provide continuous Internet connectivity to region about equator, specifically, throughout the region between ±35° latitude on the Earth.

Yet another object of the embodiments herein is to provide a method for optimization of design and performance of individual satellites and satellite constellation that provides internet connectivity at preset geographic regions.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system and method for integrated optimization of design and performance of satellite constellations. The present invention is also related to a method for optimization of design and performance of a satellite constellation that provides internet connectivity at preset geographic regions.

According to one embodiment herein, a method for integrated optimization of design and performance of satellite constellations is provided. In the method, the relationship between all subsystems is defined such that the integrity of complete design is easily tested. An integrated optimization framework is employed in which all subsystems are optimized individually and collectively within the system. Design coordinators, which are automated algorithms in every subsystem, are responsible for establishing coordination across subsystems. The design coordinators also enable the testing of integrity of the overall system and determine whether a re-design of a particular subsystem is required. Design coordinator works with a cause-effect engine to determine whether the current subsystem needs to be re-designed. Cause-effect engine of a subsystem comprises a simplified model of the subsystem and the cause-effect engine determines the effect of changes in various system parameters. When a subsystem is re-designed, the design coordinator generates the design requirements and communicates the requirements to the subsystem design or optimization routine. A detailed simulation engine is utilized by the design or optimization routine to determine the optimal design.

According to one embodiment herein, a method for enabling an integrated optimization of a satellite constellation is provided. The basic building block of a constellation is an individual satellite. Several satellite subsystem design parameters influence the behavior of a constellation directly or indirectly. The method considers a plurality of satellite and constellation parameters such as the type of constellation, satellites, payloads, launch and orbit maintenance parameters. Each subsystem within the overall system has a plurality of inputs and outputs. The integrated optimization method comprises of the following features: System and Subsystem-level optimization are both given due consideration; cross subsystem design linkages are handled iteratively; simplified representation of each subsystem (in a cause-effect engine) is used to evaluate if a subsystem level re-design is required upon a change in design of another subsystem; and, a decision logic (in a design coordinator) is employed to check the coherence of the design and to determine which subsystem needs re-design.

According to one embodiment herein, a constellation optimization method that is applicable to many types of constellations is provided and it optimizes several objectives at one time. The objectives optimized include number of satellites, coverage of particular regions, coverage density, launch cost, orbit maintenance cost, satellite manufacturing cost, satellite ground speed, inter-satellite distance metrics, and metrics that are a function of the constellation shape. The optimization includes constraints such as inter-satellite geometric constraints, maximum number of satellites, maximum altitude constraint, minimum altitude constraint, maximum eccentricity constraint, satellite radiation environment constraints that are linked to the lifetime of the satellites, availability of launch slots and other constraints that are imposed on it from satellite subsystems and business model.

According to one embodiment herein, a method for enabling fast computation of the coverage of a constellation is provided. The speed of optimization software depends on the time taken to calculate coverage by the constellation of satellite. Within the optimization software, an image based coverage matching approach is enabled that increases the speed of calculating coverage over a region by the constellation of satellites as a function of time. The process comprises the steps: create a pixel image of the region of interest by mapping latitude and longitude to pixels; create a pixel image of footprints of all satellites by first calculating the footprints in latitude-longitude map and then converting to pixels; and match the two images created to find the coverage at a particular time. For assessing whether a particular region is covered or not, boolean pixels are used. A simple logical AND operation between the two images enables the utilization of Boolean pixels. Logical AND operations are implemented efficiently in various hardware/software using SIMD (Single Instruction Multiple Data) and Open CL/CUDA, and other parallel execution schemes. The process is further extended to indicate the number of satellites covering a given region and associated metrics.

According to one embodiment herein, an optimization method for reshaping the radiation pattern of multi-beam communication satellites to reduce the total number of satellites in a constellation is provided. Satellites in a constellation have the capability to provide multiple steerable or fixed directional spot beams, which are switched on and off to cover specific locations on the Earth. The number of satellites required in a constellation to cover a region is reduced by carefully regulating the fixed or steerable spot beams of a communication satellite with a multi-beam structure.

According to one embodiment herein, a launch sequence to enable early utilization of satellites and enable achievable launch sequence based on availability of launch vehicle is provided.

According to one embodiment herein, a method for optimization of power subsystem of satellites is provided. The optimization is enabled in a constellation by determining the pattern of operation of payloads and the need of peak power. Satellites in a constellation have a pattern in which their payloads are operated. The payloads in satellites are not activated at all times, but the payloads require a high peak power when switched on. The optimization of the power subsystem of the satellite based on activation profile of the payloads reduces the mass and size of the satellite and has a direct impact on launch cost and manufacturing cost.

According to one embodiment herein, a method for optimization of power subsystem and thermal subsystem is provided. The satellite in constellation have overlapping footprints. The optimization is enabled in a constellation by determining a coordinated pattern of operation of payloads such that the duration when a payload is switched on and the duration for which it is off continuously are carefully regulated to reduce the average thermal and power loads on the satellite. This reduces the weight and size of the power and thermal subsystem which typically form more than thirty percent of a satellite's mass. The constraint on the optimization is to have continuous coverage of all desired regions.

According to one embodiment herein, a method for simultaneous optimization of the shape of the payload footprint, power subsystem, thermal subsystem and minimizing number of satellites involves occasional steering of beams beyond the nominal steering requirements.

According to one embodiment herein, a constellation of about 200 satellites to provide continuous Internet connectivity throughout the region between ±35° latitude on the Earth is provided. An optimized constellation design includes the following specifications: about 200 satellites in the constellation, 150 kg of total mass per satellite, 12 meter-square area of solar panel, battery mass of around 30 kg, orbit inclination of 30°, circular orbit, 1515 km altitude from sea level, at least 11 orbital planes, and at least 18 satellites in every orbital plane.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

The various embodiments herein provide a system and method for integrated optimization of design and performance of satellite constellations. The present invention is also related to a method for optimization of design and performance of a satellite constellation that provides internet connectivity at preset geographic regions.

According to one embodiment herein, a method for integrated optimization of design and performance of satellite constellations is provided. In the method, the relationship between all subsystems is defined such that the integrity of complete design is easily tested. An integrated optimization framework is employed in which all subsystems are optimized individually and collectively within the system. Design coordinators, which are automated algorithms in every subsystem, are responsible for establishing coordination across subsystems. The design coordinators also enable the testing of integrity of the overall system and determine whether a re-design of a particular subsystem is required. Design coordinator works with a cause-effect engine to determine whether the current subsystem needs to be re-design. Cause-effect engine of a subsystem comprises a simplified model of the subsystem and the cause-effect engine determines the effect of changes in various system parameters. When a subsystem is re-designed, the design coordinator generates the design requirements and communicates the requirements to the subsystem design or optimization routine. A detailed simulation engine is utilized by the design or optimization routine to determine the optimal design.

According to one embodiment herein, a method for enabling an integrated optimization of a satellite constellation is provided. The basic building block of a constellation is an individual satellite. Several satellite subsystem design parameters influence the behavior of a constellation directly or indirectly. The method considers a plurality of satellite and constellation parameters such as the type of constellation, satellites, payloads, launch and orbit maintenance parameters. Each subsystem within the overall system has a plurality of inputs and outputs. The integrated optimization method comprises of the following features: System and Subsystem-level optimization are both given due consideration; cross subsystem design linkages are handled iteratively; simplified representation of each subsystem (in a cause-effect engine) is used to evaluate if a subsystem level re-design is required upon a change in design of another subsystem; and, a decision logic (in a design coordinator) is employed to check the coherence of the design and to determine which subsystem needs re-design.

According to one embodiment herein, a constellation optimization method that is applicable to many types of constellations is provided and it optimizes several objectives at one time. The objectives optimized include number of satellites, coverage of particular regions, coverage density, launch cost, satellite manufacturing cost, orbit maintenance cost, satellite ground speed, inter-satellite distance metrics, and metrics that are a function of the constellation shape. The optimization includes constraints such as inter-satellite geometric constraints, maximum number of satellites, maximum altitude constraint, minimum altitude constraint, maximum eccentricity constraint, satellite radiation environment constraints that are linked to the lifetime of the satellites, availability of launch slots and other constraints that are imposed on it from satellite subsystems and business model.

According to one embodiment herein, a method for enabling fast computation of the coverage of a constellation is provided. The speed of optimization software depends on the time taken to calculate coverage by the constellation of satellite. Within the optimization software, an image based coverage matching approach is enabled that increases the speed of calculating coverage over a region by the constellation of satellites as a function of time. The process comprises the steps: create a pixel image of the region of interest by mapping latitude and longitude to pixels; create a pixel image of footprints of all satellites by first calculating the footprints in latitude-longitude map and then converting to pixels; and, match the two images created to find the coverage at a particular time. For assessing whether a particular region is covered or not, boolean pixels are used. A simple logical AND operation between the two images enables the utilization of Boolean pixels. Logical AND operations are implemented efficiently in various hardware/software using SIMD (Single Instruction Multiple Data) and Open CL/CUDA, and other parallel execution schemes. The process is further extended to indicate number of satellites covering a given region and associated metrics.

According to one embodiment herein, an optimization method for reshaping the radiation pattern of multi-beam communication satellites to reduce total number of satellites in a constellation is provided. Satellites in a constellation have a capability to provide multiple steerable or fixed directional spot beams, which are switched on and off to cover specific locations on the Earth. The number of satellites required in a constellation to cover a region is reduced by carefully regulating the fixed or steerable spot beams of a communication satellite with a multi-beam structure.

According to one embodiment herein, a method for optimization of power subsystem and thermal subsystem is provided. The satellite in constellation has overlapping footprints. The optimization is enabled in a constellation by determining a coordinated pattern of operation of payloads such that the duration when a payload is switched on and the duration for which it is off continuously are carefully regulated to reduce the average thermal and power loads on the satellite. This reduces the weight and size of the power and thermal subsystem which typically form more than thirty percent of a satellite's mass. The constraint on the optimization is to have continuous coverage of all desired regions.

According to one embodiment herein, a method for simultaneous optimization of the shape of the payload footprint.

According to one embodiment herein, an exemplary case of a method for simultaneous optimization of the shape of the payload footprint, power subsystem, thermal subsystem and minimizing number of satellites, with more weightage to minimizing number of satellites, involves using circumscribed square footprint around a nominal circular footprint which drastically reduces the number of satellites required to achieve the required coverage by about 20%.

According to one embodiment herein, an exemplary case of a method for simultaneous optimization of the shape of the payload footprint, power subsystem, thermal subsystem and minimizing number of satellites, with more weightage to optimizing power subsystem and thermal subsystem is to use circular like shaped antenna which drastically reduces the number of elements required to achieve the required coverage by about 25%, and hence the power and thermal requirements by similar magnitude.

According to one embodiment herein, a launch sequence to enable early utilization of satellites and enable achievable launch sequence based on availability of launch vehicle is provided.

According to one embodiment herein, a method for optimization of power subsystem of satellites is provided. The optimization is enabled in a constellation by determining the pattern of operation of payloads and the need of peak power. Satellites in a constellation have a pattern in which their payloads are operated. The payloads in satellites are not activated at all times, but the payloads require a high peak power when switched on. The optimization of the power subsystem of the satellite based on activation profile of the payloads reduces the mass and size of the satellite and has a direct impact on launch cost and manufacturing cost.

According to one embodiment herein, a constellation of about 200 satellites to provide continuous Internet connectivity throughout the region between ±35° latitude on the Earth is provided. An optimized constellation design includes the following specifications: about 200 satellites in the constellation, 150 kg of total mass per satellite, 12 meter square area of solar panel, battery mass of around 30 kg, orbit inclination of 30°, circular orbit, 1515 km altitude from sea level, at least 11 orbital planes, and at least 18 satellites in every orbital plane.

According to one embodiment herein, an exemplary simulation of optimization of solar panel size and mass of satellite is provided. Consider a micro-satellite whose payload is switched on when the satellite is placed above specific regions of interests. The disclosure herein reduces the combined mass of battery and solar panel by more than 48% for a satellite at 1515 km altitude with inclination 30 degrees. The area of solar panel is reduced to 12 square meter compared to conventional design of 31.45 square meter. The battery capacity is reduced to 6500 Watt hours compared to conventional requirement of 10230 Watt hours. The mass of solar panel is reduced to 16 kilograms compared to conventional mass of 42.3 kilograms. The mass of battery is reduced to 31 kilograms compared to conventional mass of 48.1 kilograms. In the present exemplary embodiment, the total mass of the subsystem is reduced to 47 kilograms compared to conventional value of 90.4 kilograms.

According to one embodiment herein, an exemplary simulation of optimization of mass of thermal subsystem is provided. Consider a micro-satellite generating thermal heat equivalent to 6 kW power during the payload ON cycle which is 4 minutes. A satellite operates at 1515 km altitude with an orbit inclination 30 degrees. By conventional methods, which consider that the heat has to be dissipated almost immediately, the weight of the thermal subsystem consisting of only a heat radiator and heat pipe is 107 kgs. By the use of the above architecture and method, the mass of thermal subsystem is reduced to 19 kg, which enables more than five times reduction in thermal subsystem weight.

Figure 1:
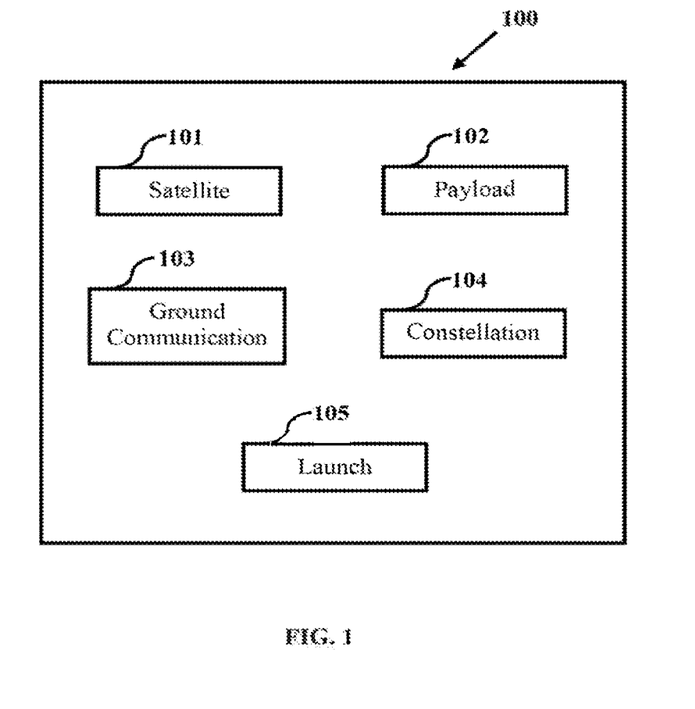
FIG. 1 illustrates a block diagram of system optimization for a satellite constellation, according to an embodiment herein.

FIG. 1 illustrates a block diagram of system optimization for a satellite constellation. The block diagram comprises a Satellite module 101, a Payload module 102, Ground Communication module 103, Constellation module 104 and Launch module 105.

Figure 2:
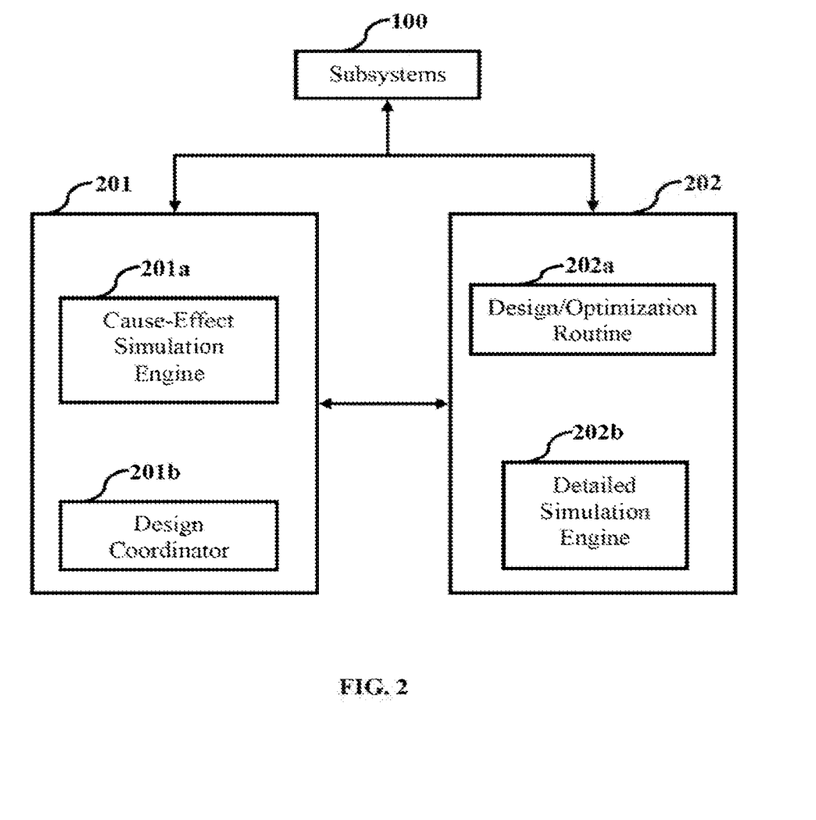
FIG. 2 illustrates a subsystem definition for an integrated system optimization, according to an embodiment herein.

FIG. 2 illustrates a subsystem definition for an integrated system optimization. The subsystem optimization module comprises the System Optimization interface 201 and Individual Optimization module 202. The System Optimization interface 201 comprises a Cause-Effect Simulation Engine 201a and a Design Coordinator module 201b. The Individual Optimization module 202 comprises a Design/Optimization Routine module 202a and Detailed Simulation Engine 202b.

Figure 3:
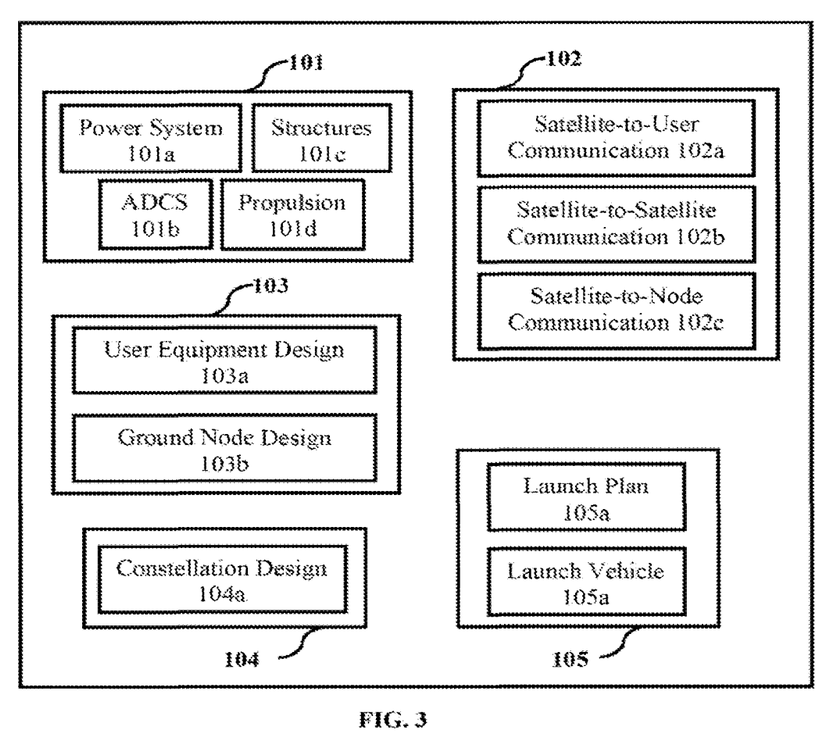
FIG. 3 illustrates an exemplary block diagram of system optimization for a satellite constellation to provide location-free internet, according to an embodiment herein.

FIG. 3 illustrates an exemplary block diagram of system optimization for a satellite constellation to provide location-free internet. The exemplary system comprises a Satellite module 101, a Payload module 102, Ground Communication module 103, Constellation module 104 and Launch module 105. The Satellite module 101 comprises Power subsystem 101a, ADCS subsystem 101b, Structures subsystem 101c and Propulsion subsystem 101d. The Payload module 101 comprises Satellite-to-User Communication subsystem 102a, Satellite-to-Satellite Communication subsystem 102b and Satellite-to-Node Communication subsystem 102c. The Ground Communication module 103 comprises User Equipment Design subsystem 103a and Ground Node Design subsystem 103b. The Constellation module 104 comprises Constellation Design subsystem 104a. The Launch module 105 comprises Launch Plan subsystem 105a and Launch Vehicle subsystem 105a.

Figure 4:
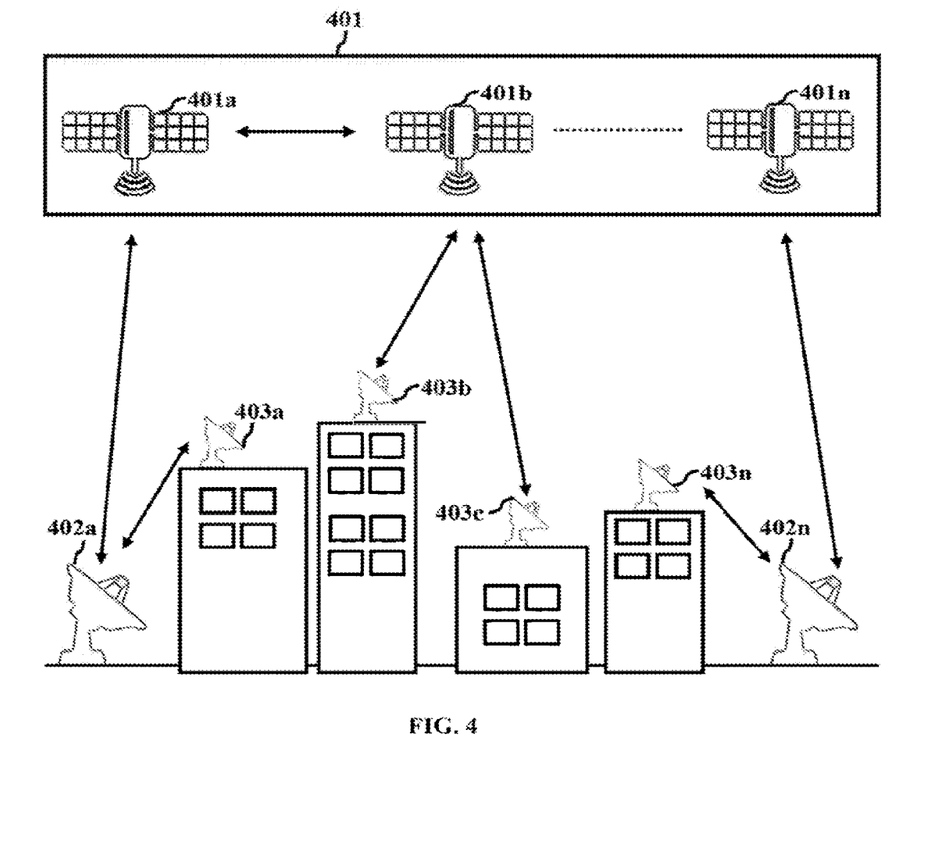
FIG. 4 illustrates an exemplary architecture of a space internet network, according to an embodiment herein.

FIG. 4 illustrates an exemplary architecture of a space internet network. The space internet network comprises a Satellite Constellation 401, a plurality of Earth Internet Gateways 402a . . . 402n and a plurality of User Terminals 403a, 403b, 403c . . . 403n. The Satellite Constellation 401 comprises a plurality of satellites 401a, 401b . . . 401n. The Satellite Constellation 401 forms a network in space, that enables a communication between the plurality of satellites 401a, 401b . . . 401n and the plurality of Earth Internet Gateways 402a . . . 402n. The network of Satellite Constellation 401 also enables communication among the plurality of satellites 401a, 401b . . . 401n, in order to enable alternate paths for data to reduce network latency and maximize performance of the network. The network of Satellite Constellation 401 also enables communication between the plurality of satellites 401a, 401b . . . 401n and the plurality of User Terminals 403a, 403b, 403c . . . 403n. A plurality of User Terminals 403a, 403b, 403c . . . 403n are also enabled to communicate with the plurality of Earth Internet Gateways 402a . . . 402n. The present disclosure is related to a system and method for integrated optimization of design and performance of satellite constellations. The present disclosure is also related to a method for optimization of design and performance of satellite constellation that provides internet connectivity at preset geographic regions. In current methods, the optimizations of subsystems are performed independently and the independent results are extrapolated and combined. This causes a loss in the overall optimality of the system and results in an increase in manufacturing and launch costs and/or loss in performance of the satellite and constellation design. The present disclosure defines the relationships between all subsystems such that the integrity of complete design is tested with very less complexities. The present disclosure also provides an integrated optimization framework in which every subsystem is optimized individually and collectively within the system. The present disclosure provides a method for optimization of power subsystem of satellites in a constellation by determining the pattern of operation of payloads and the need of peak power. The present disclosure also provides a method to minimize the number of satellites required in a constellation to cover a given geography by carefully regulating the spot beams formed by individual satellites in the constellation. The system also enables an image-based coverage matching approach that increases the speed of calculating coverage over a region by a constellation of satellites as a function of time.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. A system for an integrated optimization of a design and a performance of satellite constellations, the system comprising:
    a satellite constellation, wherein the satellite constellation comprises a plurality of satellites orbiting the Earth;
    a plurality of first satellite payload modules for inter-satellite communication ($P_i$s);
    a plurality of earth internet gateways;
    a plurality of second satellite payload modules for communication between the satellite constellation and the plurality of earth internet gateways ($P_e$s);
    a plurality of user terminals;
    a plurality of third satellite payload modules for communication between the satellite constellation and the plurality of user terminals (Pus); and
    a transmitting medium;
    a sub-system optimization module comprising a processor configured for:
    optimizing a plurality of satellites in a satellite constellation;
    optimizing mass of the plurality of satellites in the satellite constellation;
    optimizing reliability and performance of the satellite constellation:
    optimizing power consumed by a plurality of payload modules in the plurality of satellites in the satellite constellation;
    maximizing an antenna performance of a plurality of user terminals; and
    designing a launch plan for launching the plurality of satellites in the satellite constellation.

2. The system according to claim 1, wherein the plurality of first satellite payload modules for inter-satellite communication ($P_i$s) are part of a plurality of satellites in the satellite constellation and wherein, the $P_i$s is configured to establish communication among the plurality of satellites.

3. The system according to claim 1, wherein the plurality of earth internet gateways are transceivers installed at a plurality of locations on the Earth, and wherein the earth internet gateways are configured to communicate with the satellite constellation.

4. The system according to claim 1, wherein the plurality of second satellite payload modules for communication between the satellite constellation and the plurality of earth internet gateways ($P_e$s) are part of a plurality of satellites in the satellite constellation and wherein, the $P_e$s are configured to establish communication between the plurality of satellites and the plurality of earth internet gateways.

5. The system according to claim 1, wherein the plurality of user terminals are end-point devices on the Earth, and wherein the plurality of user terminals are configured to communicate with the satellite constellation and the plurality of earth internet gateways.

6. The system according to claim 1, wherein the plurality of third satellite payloads for communication between the satellite constellation and the plurality of user terminals ($P_u$s) are part of a plurality of satellites in the satellite constellation and wherein the plurality of user terminals ($P_u$s) are configured to establish communication between the plurality of satellites and the plurality of user terminals.

7. The system according to claim 1, wherein the step of optimizing the plurality of satellites in a satellite constellation comprises one or more steps of optimizing an altitude of the plurality of satellites, an inclination of the plurality of satellites, a shape of payload footprint and usage of steerable spot-beams for optimizing a design and performance of satellite constellations.

8. The system according to claim 1, wherein the step of optimizing the mass of the plurality of satellites in the constellation comprises one or more steps of individually optimizing mass of each subsystem and reducing a power requirement of the payload, and wherein the step of reducing the power requirement of the payload comprises optimizing a solar panel and a battery, and mass of major subsystems comprising thermal and control subsystems, and in turn structural subsystem.

9. The system according to claim 1, wherein the power consumed by a plurality of payload modules in the plurality of satellites of the satellite constellation is optimized based on a payload module in each satellite, and wherein payload modules is selected for service areas from a group consisting of a plurality of first satellite payload modules for inter-satellite communication ($P_i$s), a plurality of second satellite payload modules for communication between the satellite constellation and a plurality of earth internet gateways ($P_e$s), and a plurality of third satellite payload modules for communication between the satellite constellation and the plurality of user terminals ($P_u$s).

10. The system according to claim 5, wherein the power consumed by the plurality of third satellite payload modules for communication between the satellite constellation and the plurality of user terminals ($P_u$s) is optimized by minimizing a number of beams and increasing a signal-to-noise ratio, and wherein a number of antenna elements is minimized by selecting a shape of array antenna including planar and non-planar shapes and beam width of the plurality of antenna elements.

11. The system according to claim 1, wherein the antenna performance of the plurality of user terminals is optimized by asymmetric antenna design with lesser number of elements in a user antenna than that in a satellite payload antenna.

12. The system according to claim 1, wherein network latency is optimized by distributing earth internet gateways on the Earth in an uneven manner, and wherein a placement of the earth internet gateways is concentrated in regions of higher population.

13. The system according to claim 1, wherein the launch plan for launching the plurality of satellites in the satellite constellation is optimized by minimizing time, cost and risk to launch the constellation, and wherein a plurality of launch plans are formulated for a plurality of satellites in a constellation based on launch vehicle availability with one or more launch service providers.

* * * * *